United States Patent Office 3,305,571
Patented Feb. 21, 1967

3,305,571
METHOD FOR THE INITIATION OF A REACTION BETWEEN ISOPROPYL ALCOHOL AND ALUMINUM
Moses Cenker, Trenton, Mich., assignor to Wyandotte Chemicals Corporation, Wyandotte, Mich., a corporation of Michigan
No Drawing. Filed Jan. 31, 1963, Ser. No. 255,209
12 Claims. (Cl. 260—448)

This invention relates to a method of initiating a reaction between isopropyl alcohol and aluminum at atmospheric pressure. More particularly, this invention relates to a method of initiating a reaction between isopropyl alcohol and aluminum at atmospheric pressure which is especially useful in a batch process for the production of aluminum isopropoxide. In another aspect this invention relates to a process for preparing aluminum isopropoxide at atmospheric pressure.

Aluminum isopropoxide is a known chemical and is useful as a catalyst, a reducing agent for aldehydes and ketones, and for the preparation of aluminum salts and specially activated aluminum.

The initiation of the reaction between isopropyl alcohol and aluminum has been a serious problem to the preparation of aluminum isopropoxide by batch processes operated at atmospheric pressure. While it has been disclosed that this reaction initiates under conditions of high temperature and pressure, it has been found that the reaction does not initiate at atmospheric pressure in the absence of added catalyst. It is well known that processes operated at superatmospheric pressure have certain inherent disadvantages such as the requirement of expensive equipment and the likelihood of safety hazards. Thus, such processes are generally avoided if the same result can be accomplished at atmospheric pressure.

In the past, compounds such as mercuric chloride have been utilized to initiate the reaction. While mercuric chloride added to a mixture of aluminum and isopropyl alcohol quickly initiates the reaction, the reaction is exothermic and, due to the heat evolved, is difficult to control. This often results in the reactants boiling out of the reactor. In addition to the violent nature of the reaction, mercuric chloride is reduced to mercury during the reaction and removal of the mercury from the aluminum isopropoxide product is difficult. Therefore, for the above reasons mercuric chloride has been found to be an undesirable catalyst for initiating the reaction between isopropyl alcohol and aluminum.

U.S. Patent No. 2,845,447 discloses that the introduction of aluminum alkoxide in an amount of 1 to 10% by weight of the alcohol charge often will enable initiation of the reaction at a somewhat lower pressure and temperature than would be required in its absence. Unfortunately in the case of reacting isopropyl alcohol with aluminum it has been found that either superatmospheric pressure is still required to initiate the reaction even though 1 to 10% by weight of aluminum isopropoxide is employed or an extremely long induction period is necessary. This conclusion was reached after heating mixtures of aluminum, aluminum isopropoxide and isopropyl alcohol containing up to 35% by weight of aluminum isopropoxide based on the total weight of aluminum isopropoxide and isopropyl alcohol for a minimum of 2 hours and observing no evidence of a reaction.

U.S. 2,845,447 is concerned in general with a continuous process for producing metal alkoxides operable under superatmospheric pressure, while the present invention is concerned with initiation of reaction in a batch process operated under atmospheric pressure but obviously is also of value in the start-up of a continuous process. Different problems must be overcome in a batch process. Due to the nature of a batch process, start-ups and shut-downs are frequent while they are infrequent in a continuous process. Therefore, a long induction period for initiation of the reaction between isopropyl alcohol and aluminum cannot be tolerated in a batch operation but could be tolerated in a continuous process. Further, violent reaction is undesirable in process equipment operated at atmospheric pressure but would not appreciably affect closed systems utilized in superatmospheric pressure processes.

Thus, the methods known in the art for initiating a reaction between isopropyl alcohol and aluminum have certain disadvantages when applied to a batch process for producing aluminum isopropoxide at atmospheric pressure.

Therefore, an object of the present invention is to provide a method for rapidly and controllably initiating reaction between isopropyl alcohol and aluminum at atmospheric pressure.

Another object of the present invention is to provide a novel method of preparing aluminum isopropoxide.

The above and other objects will become apparent as the following description of the present invention proceeds.

In accordance with the present invention aluminum, aluminum isopropoxide, and isopropyl alcohol are introduced into a reaction vessel, aluminum isopropoxide being present in the proportion of about 87 to 95% by weight of the total isopropyl alcohol-aluminum isopropoxide weight. The chemicals are mixed and heated to a temperature of about 88 to 150° C. at atmospheric pressure to initiate a reaction between isopropyl alcohol and aluminum.

It was unexpectedly discovered that the above method utilizing an extremely high concentration of aluminum isopropoxide and high temperature causes the reaction between isopropyl alcohol and aluminum to initiate quickly, i.e. instantly or in a matter of minutes. In addition, it was discovered that the reaction proceeds rapidly but without violence. Thus, no boil-over problem exists. The method adds no contaminants to the system and is especially useful in the start-up of batch processes for the preparation of aluminum isopropoxide at atmospheric pressure.

The discovery was completely unexpected in view of the fact that tests based on the teaching in the art of 1 to 10% of aluminum alkoxide as a catalyst did not initiate the reaction in a batch process operated at atmospheric pressure. Even when the catalyst concentration was increased to 75% the reaction initiated only after an extremely long induction period (13 hours). The aluminum isopropoxide concentration disclosed herein is not only unexpectedly effective in the process but critical. It is also contra to well-known concepts of reaction kinetics. Normally when a reaction mixture contains a low concentration of reactants and an extremely high concentration of product the reaction tends to slow down or stop. However, here the reaction initiates quickly and proceeds rapidly under these conditions.

As stated above the first step of the present process is to introduce aluminum, aluminum isopropoxide, and isopropyl alcohol into a reaction vessel. It is contemplated that the scope of this invention includes initially charging only aluminum and aluminum isopropoxide to the vessel. If such a procedure is followed the aluminum and aluminum isopropoxide are mixed and heated to the stated temperature range and then isopropyl alcohol is added to the mixture to form the required mixture concentration. Thus the method of this invention includes both adding aluminum, aluminum isopropoxide and isopropyl alcohol to the vessel before heating and adding aluminum and aluminum isopropoxide to the vessel, heating to a temperature in the range disclosed herein, and then adding isopropyl alcohol. Either procedure gives excellent results.

The aluminum useful in this invention may be pure, impure or alloyed metal; however, pure aluminum is preferred. Aluminum alloys containing iron and copper have been found to reduce the yield of aluminum isopropoxide. Aluminum in the form of grains, shot, granules, turnings, fragments or the like may be employed in the present method. Preferably the aluminum particle size should be less than ¼ inch to insure fast reaction. In general, the smaller the particle size the faster the reaction. The particular quantity of aluminum introduced into the reaction vessel is immaterial. Usually an amount in excess of that necessary to react with the quantity of isopropyl alcohol added during initiation of the reaction is employed.

Commercially available isopropyl alcohol is adequate for use in the present method. However, the alcohol must be substantially free of water. Common methods utilized in the art for reducing the water content of an alcohol may be employed. For the best operation of the process, the water content should be reduced to a maximum of about 0.05 weight percent. Since water in the reaction mixture is detrimental to the reaction between isopropyl alcohol and aluminum in that it inhibits the reaction, it is advisable to reduce the water content n the isopropyl alcohol as low as economically feasible.

Aluminum isopropoxide utilized for initiation of the reaction may be obtained commercially or as the product of a prior run. The isopropoxide should also be substantially free of water. In the reaction mixture consisting of aluminum, isopropyl alcohol, and aluminum isopropoxide, the concentration of aluminum isopropoxide is dependent upon the concentration of isopropyl alcohol. Aluminum isopropoxide present in the mixture should constitute about 87 to 95% by weight of the total aluminum isopropoxide and isopropyl alcohol concentration. Preferably the aluminum isopropoxide concentration should be about 90 to 95%.

In carrying out the method of this invention a reaction vessel is preferred that is equipped with mixing means, heating means, a reflux condenser for condensing isopropyl alcohol vapors and returning the alcohol to the reaction mixture, and means for introducing alcohol continuously into the vessel at a controlled flow rate. To carry out the method, aluminum, aluminum isopropoxide and isopropyl alcohol are introduced into the reaction vessel. Sufficient aluminum isopropoxide is present to constitute about 87 to 95% by weight of the total aluminum isopropoxide-isopropyl alcohol weight. The chemicals are mixed and heated to a temperature of about 88 to 150° C. and preferably about 100 to 130° C. In general the reaction is carried out at the boiling point or reflux temperature of the reaction mixture. The boiling point will vary with the concentration of aluminum isopropoxide and alcohol in the mixture. The lower limit of the broad temperature range of 88 to 150° C. represents about the minimum temperature at which the reaction between isopropyl alcohol and aluminum will commence and reactions above the upper limit may result in decomposition of aluminum isopropoxide.

As pointed out earlier, the above procedure may be modified by introducing the desired quantity of isopropyl alcohol into a mixture of aluminum and aluminum isopropoxide after it has been heated to a temperature in the range of 88 to 150° C. Such a modification of the method set forth hereinabove is considered within the scope of the present invention.

When the boiling point has been reached the reaction commences quickly. While the reaction may be carried out at any temperature within the broad temperature range of 88 to 150° C. preferably the reaction is carried out at the boiling point or reflux temperature of the mixture. Since the rate of reaction is affected by temperature and concentration of reactants, the optimum conditions of temperature and concentration are present at the boiling point of the mixture. Upon reaching the boiling point of the mixture isopropyl alcohol vapors are evolved, and after the reaction commences hydrogen gas is liberated and forms a gas phase with the alcohol vapors. The isopropyl alcohol vapors and hydrogen gas are passed to the condenser wherein the isopropyl alcohol is condensed and returned to the reaction vessel. The hydrogen gas produced by the reaction is normally allowed to escape from the reactor. This refluxing is continued during the entire reaction period.

The particular period of time required before the reaction initiates varies with concentration of isopropyl alcohol and aluminum isopropoxide and temperature. For example when the reaction mixture was heated to 88° C. the reaction initiated in 7 minutes. At slightly higher temperatures the reaction initiated immediately upon reaching the desired temperature. It is easily determined when the reaction commences since hydrogen gas is evolved.

The method of initiating the reaction between isopropyl alcohol and aluminum described herein is readily adaptable to a batch process for preparing aluminum isopropoxide. All that is required to continue the reaction after initiation is to continuously replace isopropyl alcohol used up in converting aluminum to aluminum isopropoxide to maintain an isopropyl alcohol concentration of 5 to 13% based on the total weight of isopropyl alcohol and aluminum ispropoxide. This is easily attained by adding isopropyl alcohol to the reaction mixture at a rate sufficient to maintain a constant boiling point or reflux temperature in the range of 88 to 150° C. While there is no objection to varying the temperature during the reaction, it is advantageous to maintain a constant temperature so that the addition of isopropyl alcohol can be more easily controlled. A slight excess of isopropyl alcohol over that theoretically required to react with all of the aluminum present in the mixture, about 2%, is added to insure complete reaction of the aluminum. After all the isopropyl alcohol has been introduced into the reaction vessel, heating should be continued until the evolution of hydrogen gas has substantially subsided to complete the reaction.

After the reaction has been completed the crude aluminum isopropoxide product is distilled to remove unreacted isopropyl alcohol from the aluminum isopropoxide. Use of a portion of the crude aluminum isopropoxide product with aluminum is a convenient method of charging the reaction vessel for the next batch. Yields of aluminum isopropoxide have ranged from 91 to 95% based on aluminum and from 94 to 98% based on isopropyl alcohol.

In the continuous process for preparing aluminum isopropoxide described above, aluminum may also be added continuously to the reaction mixture at a rate sufficient to maintain a quantity of aluminum in the mixture in excess of that necessary to react with the isopropyl alcohol present in the mixture. When the reaction is carried out in this manner the isopropyl alcohol concentration is still maintained at 5 to 13% based on the total weight of isopropyl alcohol and aluminum isopropoxide and the temperature maintained in the range of 88 to 150° C. However, in addition it is desirable to continuously remove the crude aluminum isopropoxide product from the reaction mixture and purify it according to the method described above.

The following examples are intended to particularly illustrate the present invention but should not be used to limit, unduly, the scope of the invention.

*Example I*

The apparatus used in the examples was a 3-necked round-bottom flask fitted with a mechanical stirrer, a thermometer, and a reflux condenser. 99 grams of aluminum (—8 +20 mesh), 217 grams of aluminum isopropoxide, and 33 grams of isopropyl alcohol were introduced into the 3-necked flask. The concentration of aluminum isopropoxide based on the total weight of isopropyl alcohol and aluminum isopropoxide was 87% by weight.

The mass was heated while mixing to about 88° C. and refluxing began. After about 7 minutes of refluxing at a temperature of 88–88.5° C. rapid evolution of hydrogen gas started. The evolution of hydrogen gas indicated that the reaction between isopropyl alcohol and aluminum had been initiated. The reaction was rapid but not violent.

*Example II*

100 grams of aluminum (—8 +20 mesh), 90 grams of aluminum isopropoxide and 10 grams of isopropyl alcohol were introduced into the 3-necked flask. The concentration of aluminum isopropoxide in the example was 90% of the total aluminum isopropoxide-isopropyl alcohol weight.

The mass was heated while mixing. When the temperature reached 94° C. rapid refluxing took place with rapid evolution of hydrogen. In this run the reaction between isopropyl alcohol and aluminum was initiated immediately upon the reaction mixture reaching 94° C. The reaction was rapid but not violent.

*Example III*

This example illustrates initiation of the reaction between isopropyl alcohol and aluminum and continuation of the reaction in a batch process for the production of aluminum isopropoxide.

The apparatus described in Example I was modified by fitting the reaction flask with an addition funnel to introduce alcohol below the surface of the reaction mixture. 100 grams of aluminum (—8 +20 mesh), 90 grams of aluminum isopropoxide, and 10 grams of isopropyl alcohol were charged to the 3-necked reaction flask, and 740 grams of isopropyl alcohol were charged to the addition funnel. The total amount of alcohol was equal to 12% excess over that required for complete reaction of the aluminum. The amount of aluminum isopropoxide present was equal to 90% of the total weight of aluminum isopropoxide and isopropyl alcohol charged to the flask initially.

The material in the reaction flask was heated while mixing, and when the temperature rose to about 94° C. vigorous gas evolution and refluxing began. However, the reaction was not violent. After the reaction initiated, the temperature of the mixture continued to rise due to the reduction in the concentration of isopropyl alcohol caused by the reaction. Addition of isopropyl alcohol from the addition funnel was then started and temperature of the reaction mixture adjusted to the range of 108 to 115° C. by regulating the flow of isopropyl alcohol into the flask to obtain a reaction mixture that refluxed in that range.

Addition of the theoretical amount of isopropyl alcohol required about 2.5 hours. About 6 more hours were required to add the excess alcohol and finish the reaction. Then the crude product was removed from the flask. Impurities were removed by distillation and the yield of distilled aluminum isopropoxide obtained from the run was found to be 91% based on aluminum and 94% based on isopropyl alcohol.

*Example IV*

This example was carried out according to the procedure of Example III. However, the temperature of the reaction mixture was adjusted to the range of 123 to 127° C. during the isopropyl alcohol addition.

The yield of distilled aluminum isopropoxide was calculated to be 92% based on aluminum and 95% based on isopropyl alcohol.

*Example V*

This example also was carried out according to the procedure of Example III. However the temperature of the reaction mixture was adjusted to the range of 135 to 144° C. and the addition of the theoretical amount of isopropyl alcohol required 4.5 hours.

The yield of distilled aluminum isopropoxide was calculated to be 92% based on aluminum and 96% based on isopropyl alcohol.

*Example VI*

In this example isopropyl alcohol was not added to the reaction flask until the desired reaction temperature was obtained.

The apparatus described in Example I was utilized with a reservoir and bellows pump to introduce isopropyl alcohol below the surface of the reaction mixture.

100 grams of aluminum (—8 +20 mesh) and 90 grams of aluminum isopropoxide were charged to the 3-necked reaction flask and heated with mixing to 125° C. 10 grams of isopropyl alcohol were introduced into the reaction flask. Refluxing began immediately and in about 7 minutes hydrogen gas began evolving rapidly which indicated that the reaction between isopropyl alcohol and aluminum had been initiated.

*Example VII*

This example illustrates initiation of the reaction between isopropyl alcohol and aluminum and continuation of the reaction to produce aluminum isopropoxide.

The apparatus described in Example VI was used. 100 grams of aluminum (—8 +20 mesh) and 90 grams of aluminum isopropoxide were charged to the 3-necked reaction flask. The material was heated with mixing to 125° C. 10 grams of isopropyl alcohol were added to the reaction flask. The temperature dropped to about 94° C., refluxing began and hydrogen evolved rapidly in about 7 minutes. After a few minutes the temperature returned to 125° C. Alcohol addition was then resumed at the rate of 600 ml. per hour until a total of 680 grams (870 ml.) of isopropyl alcohol (2% excess) was added. The temperature of the reaction mixture was held at 94 to 130° C. during the addition period. Heating was continued after the alcohol addition was complete until the gas evolution ceased. Total reaction time was 2½ hours.

The crude product was removed from the flask and distilled to remove impurities. The yield of aluminum isopropoxide was calculated to be 95% based on aluminum and 98% based on isopropyl alcohol.

*Example VIII*

This example is included to illustrate that the present method of initiating a reaction between isopropyl alcohol and aluminum is unobvious in view of the teachings in the art.

The same apparatus as used in Example I was used in this example. 99 grams of aluminum (—8 +20 mesh) and 854 grams of isopropyl alcohol were charged into the 3-necked round-bottom flask fitted with a mechanical stirrer, thermometer, and condenser. The aluminum-isopropyl alcohol mixture was heated and mixed at reflux (81–82° C.) for 3 hours without any signs of reaction. Aluminum isopropoxide was added to the mixture after three hours in increments of 10, 90, 100, 100, and 150 grams at 2-hour intervals between each addition. After the final increment of aluminum isopropoxide was added the mixture was heated at reflux another 2 hours. The aluminum isopropoxide-isopropyl alcohol mixture at the end of the experiment was equivalent to a 35% aluminum isopropoxide solution.

During the entire run no evidence of initiation of the reaction between isopropyl alcohol and aluminum was observed.

Example IX

This example illustrates that the aluminum isopropoxide range disclosed herein is critical to obtain fast controlled initiation of the reaction between isopropyl alcohol and aluminum.

27 grams of aluminum (−8 +20 mesh), 1200 grams of aluminum isopropoxide, and 400 grams of isopropyl alcohol were added to the 3-necked flask described in Example I. The material was heated while mixing to the reflux temperature of 85–85.5° C. Heating was continued and after 2 hours the reaction initiated slowly. The reaction proceeded slowly for 11 hours and then became violent. This resulted in the reaction mixture boiling out of the reaction flask.

Thus it is apparent from the foregoing that a novel method of initiating a reaction between isopropyl alcohol and aluminum has been discovered. This method is characterized by quick controlled initiation of the reaction at atmospheric pressure and is especially adapted for use in a batch process for preparing aluminum isopropoxide which is operated at atmospheric pressure.

I claim:

1. A method of initiating a reaction between isopropyl alcohol and aluminum at atmospheric pressure which comprises the steps of
   (A) introducing aluminum, aluminum isopropoxide and isopropyl alcohol into a reaction vessel, said aluminum isopropoxide constituting about 87 to 95% by weight of the total weight of aluminum isopropoxide and isopropyl alcohol,
   (B) mixing said aluminum, aluminum isopropoxide and isopropyl alcohol to form a mixture, and
   (C) simultaneously heating the mixture to a temperature of about 88 to 150° C. to initiate the reaction between isopropyl alcohol and aluminum.

2. The method of claim 1 wherein said aluminum isopropoxide constitutes about 90 to 95% by weight of the total weight of aluminum isopropoxide and isopropyl alcohol.

3. The method of claim 1 wherein said temperature is about 100 to 130° C.

4. The method of claim 1 wherein said aluminum isopropoxide constitutes about 90 to 95% by weight of the total weight of aluminum isopropoxide and isopropyl alcohol and wherein said temperature is about 100 to 130° C.

5. A method of initiating a reaction between isopropyl alcohol and aluminum at atmospheric pressure which comprises the steps of
   (A) introducing aluminum and aluminum isopropoxide into a reaction vessel,
   (B) heating the aluminum and aluminum isopropoxide to a temperature of about 88 to 150° C., and
   (C) introducing isopropyl alcohol into the reaction vessel while mixing to obtain a mixture containing initially 87 to 95% by weight of aluminum isopropoxide based on the total weight of aluminum isopropoxide and isopropyl alcohol, thereby initiating the reaction between isopropyl alcohol and aluminum.

6. The method of claim 5 wherein said aluminum isopropoxide constitutes about 90 to 95% by weight of the total weight of aluminum isopropoxide and isopropyl alcohol.

7. The method of claim 5 wherein said temperature is about 100 to 130° C.

8. The method of claim 5 wherein said aluminum isopropoxide constitutes about 90 to 95% by weight of the total weight of aluminum isopropoxide and isopropyl alcohol and wherein said temperature is about 100 to 130° C.

9. A process for the production of aluminum isopropoxide at atmospheric pressure which comprises the steps of
   (A) introducing aluminum, aluminum isopropoxide and isopropyl alcohol into a reaction vessel, said aluminum isopropoxide constituting about 87 to 95% by weight of the total weight of aluminum isopropoxide and isopropyl alcohol,
   (B) mixing said aluminum, aluminum isopropoxide and isopropyl alcohol to form a mixture,
   (C) simultaneously heating the mixture to a temperature of about 88 to 150° C. thereby initiating the reaction between isopropyl alcohol and aluminum, and
   (D) continuously introducing isopropyl alcohol into the mixture after the reaction has initiated and until substantially all of the aluminum has reacted to maintain the concentration of isopropyl alcohol in the mixture at about 5 to 13% by weight based on the total weight of aluminum isopropoxide and isopropyl alcohol in the mixture.

10. A process for the production of aluminum isopropoxide at atmospheric pressure which comprises the steps of
    (A) introducing aluminum and aluminum isopropoxide into a reaction vessel,
    (B) heating the aluminum and aluminum isopropoxide to a temperature of about 88 to 150° C.,
    (C) introducing isopropyl alcohol into the reaction vessel while mixing to obtain a mixture containing initially 87 to 95% by weight of aluminum isopropoxide based on the total weight of aluminum isopropoxide and isopropyl alcohol, thereby initiating the reaction between isopropyl alcohol and aluminum, and
    (D) continuously introducing isopropyl alcohol into the mixture after the reaction has initiated and until substantially all the aluminum has reacted to maintain the concentration of isopropyl alcohol in the mixture at about 5 to 13% based on the total weight of aluminum isopropoxide and isopropyl alcohol in the mixture.

11. A process for the production of aluminum isopropoxide at atmospheric pressure which comprises the steps of
    (A) introducing aluminum, aluminum isopropoxide and isopropyl alcohol into a reaction vessel, said aluminum isopropoxide constituting about 87 to 95% by weight of the total weight of aluminum isopropoxide and isopropyl alcohol,
    (B) mixing said aluminum, aluminum isopropoxide and isopropyl alcohol to form a mixture,
    (C) simultaneously heating the mixture to a temperature of about 88 to 150° C. thereby initiating the reaction between isopropyl alcohol and aluminum, and
    (D) continuously introducing isopropyl alcohol and aluminum into the mixture after the reaction has initiated to maintain the concentration of isopropyl alcohol in the mixture at about 5 to 13% by weight based on the total weight of aluminum isopropoxide and isopropyl alcohol in the mixture and to maintain an excess of aluminum in the mixture over that required to react with the isopropyl alcohol present.

12. A process for the production of aluminum isopropoxide at atmospheric pressure which comprises the steps of
    (A) introducing aluminum and aluminum isopropoxide into a reaction vessel,
    (B) heating the aluminum and aluminum isopropoxide to a temperature of about 88 to 150° C.,
    (C) introducing isopropyl alcohol into the reaction vessel while mixing to obtain a mixture containing initially 87 to 95% by weight of aluminum isopropoxide based on the total weight of aluminum isopropoxide and isopropyl alcohol, thereby initiating the reaction between isopropyl alcohol and aluminum, and (D) continuously introducing isopropyl alcohol and aluminum into the mixture after the reaction has initiated to maintain the concentration of isopropyl alcohol in the mixture at about 5 to 13% by weight based on the total weight of aluminum isopropoxide and isopropyl alcohol in the mixture and to maintain an excess of aluminum in the mixture over that required to react with the isopropyl alcohol present.

References Cited by the Examiner

FOREIGN PATENTS 602,276   9/1934   Germany.

HELEN M. McCARTHY, *Acting Primary Examiner.*
TOBIAS E. LEVOW, *Examiner.*
H. M. S. SNEED, *Assistant Examiner.*